Dec. 27, 1949     E. J. KORECKY     2,492,227
APPARATUS FOR MAKING SHACKLE BOLTS
Filed July 17, 1946     2 Sheets-Sheet 1
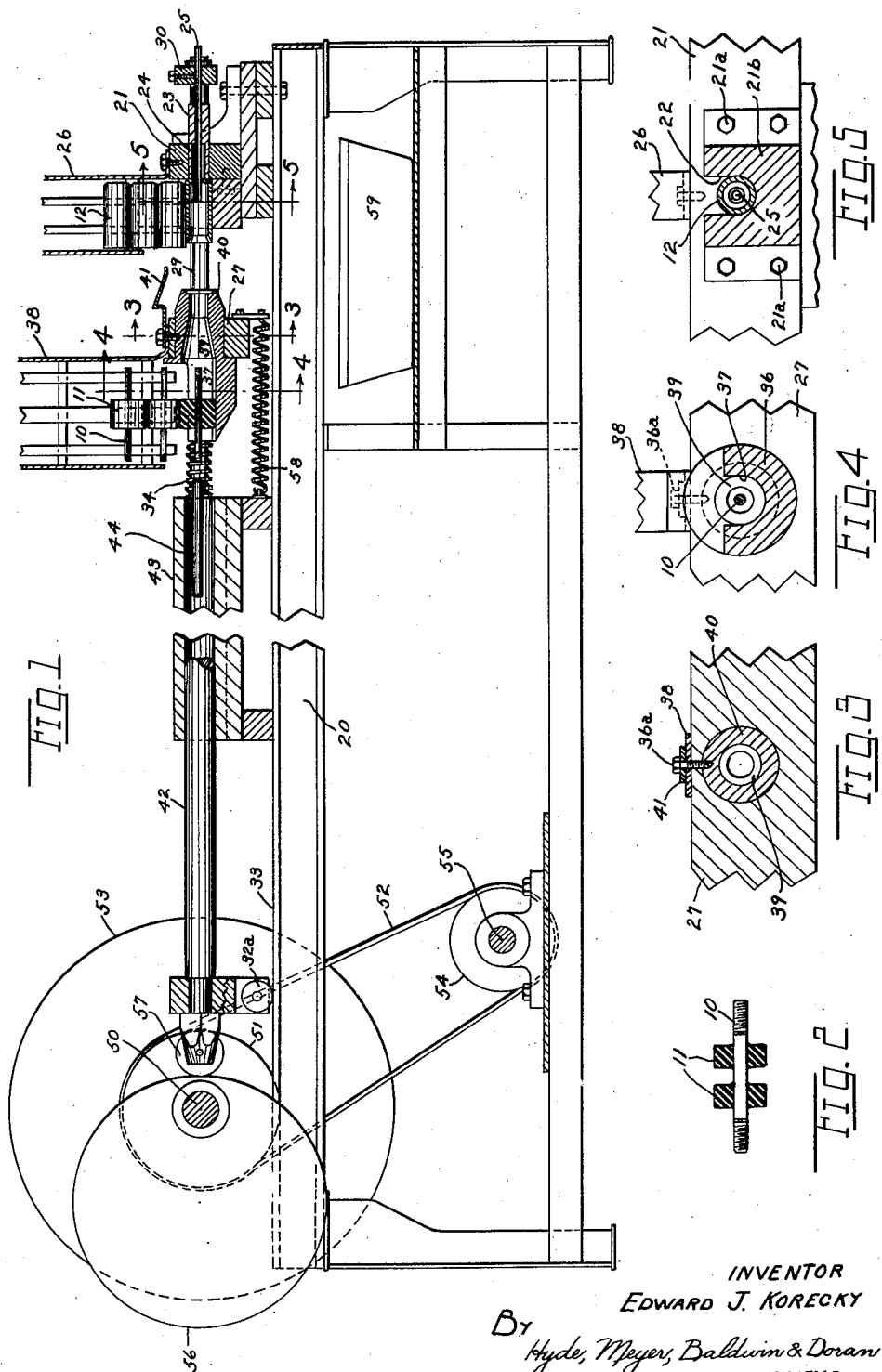
INVENTOR
EDWARD J. KORECKY
BY Hyde, Meyer, Baldwin & Doran
ATTORNEYS Dec. 27, 1949 E. J. KORECKY 2,492,227
APPARATUS FOR MAKING SHACKLE BOLTS
Filed July 17, 1946 2 Sheets-Sheet 2
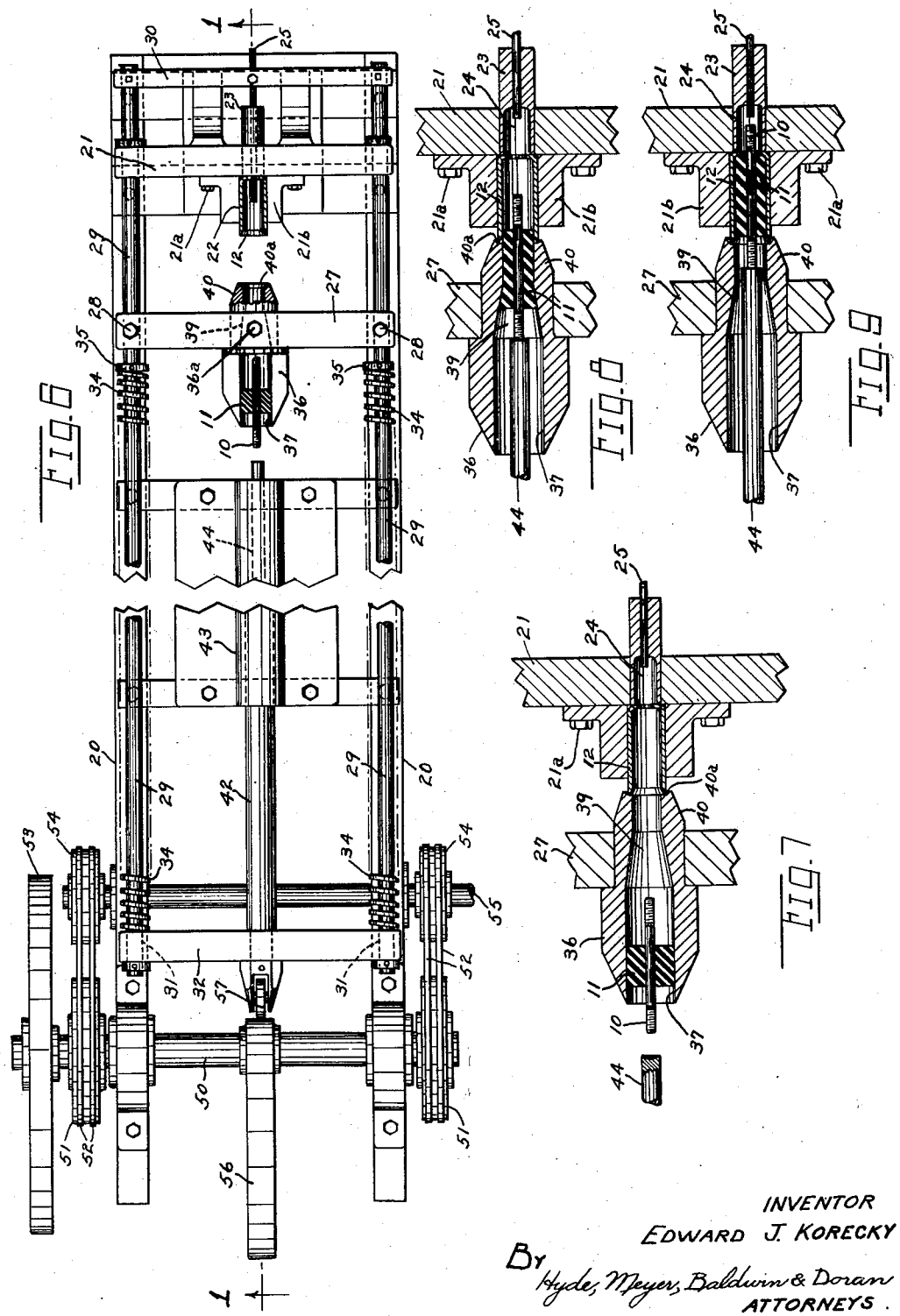
INVENTOR
EDWARD J. KORECKY
By Hyde, Meyer, Baldwin & Doran
ATTORNEYS.

Patented Dec. 27, 1949

2,492,227

UNITED STATES PATENT OFFICE 2,492,227

APPARATUS FOR MAKING SHACKLE BOLTS

Edward J. Korecky, Shaker Heights, Ohio, assignor to Barmatic Machines, Inc., Cleveland, Ohio, a corporation of Ohio Application July 17, 1946, Serial No. 684,376

4 Claims. (Cl. 29—235)

This invention relates to apparatus for making or assembling shackle bolt units, such as are used for mounting spring ends to the frames of motor vehicles. The invention has more particular relation to that form of unit in which the bolt itself, usually threaded at both ends, is mounted in a yielding and resilient sleeve of rubber or rubber-like material, which, in turn, is housed within an enclosing tubular metal sheath. In the manufacture of such shackle bolt units, the rubber sleeve is first mounted upon the bolt, either by molding the sleeve in situ or by pushing the bolt through the sleeve. In this partial assembly the rubber sleeve closely hugs the bolt, either because it was molded upon the bolt and thus clings to it, or because the original hole in the sleeve, through which the bolt was pushed, was smaller than the bolt, requiring radial expansion or stretching of the sleeve during the process of assembly. But, more important, the sleeve, assembled upon the bolt, is shorter and of greater external diameter than the space within the metal sheath which it is designed to fill, the reason for which is the desire that in the final product the rubber-like mass shall be under fairly heavy compression both radially and longitudinally, and with very slight deformation by compression under varying load conditions, and in such condition as to firmly unite the bolt and sheath and prevent their escape from each other.

Final and complete assembly of the rubber covered bolt with the enclosing sheath thus requires the rubber sleeve to be both reduced diametrically and elongated endwise and then shoved into the sheath to its home position. It is with this final operation that the present invention is concerned.

One object of the invention, therefore, is to provide simple, improved and highly efficient mechanism for assembling the rubber covered bolt with its cooperating sheath.

Another object is to provide improved apparatus of the character described in which the sheath and rubber covered bolt are telescoped by relative endwise motion during which the rubber sleeve is appropriately deformed, by diametrical reduction and endwise elongation preparatory to its entry into the sheath.

Still another object is to provide an improved machine in which the two parts to be assembled are each fed or supplied automatically from magazines, so that the apparatus is self-serving and does not require constant attention.

Another object is to provide improved means so arranged that as the forming or assembling parts approach the end of the empty sheath being assembled, the next sheath waiting in line, is moved out of the way to a position where it does not interfere with the assembly operation going on.

Another object is to provide improved means for automatically ejecting each finished shackle bolt to clear the way for the next assembling operation.

Finally, another object is to provide an improved machine for the purposes mentioned, which operates rapidly, with a high production rate, which is durable and not likely to get out of order in service, and which performs its duty efficiently and with minimum rejection of faulty product.

Other objects of the invention in part are obvious and in part will appear more in detail hereinafter.

In the drawings, which represent one suitable embodiment of the invention, Fig. 1 is a longitudinal sectional elevation on the line 1—1, Fig. 6;

Fig. 2 is a detail view, partly in section, showing another form of bolt and sleeve assembly, ready for insertion into its sheath;

Fig. 3 is a detail section on the line 3—3, Fig. 1;

Fig. 4 is a detail section on the line 4—4, Fig. 1;

Fig. 5 is a detail cross section on the line 5—5, Fig. 1;

Fig. 6 is a detail plan view, the magazines being omitted for simplicity of illustration;

Fig. 7 is a detail longitudinal section, on a larger scale, of the forming and assembling parts; and Figs. 8 and 9 are similar views, at other stages of the assembling operation.

Before describing the apparatus, it may be well, first, to refer briefly to the article and the way it is made. Fig. 9 shows the completed shackle bolt unit, comprising steel bolt 10, sleeve 11 made of rubber or any suitable rubber-like material and surrounding the bolt, and metal sheath 12, usually a steel sleeve, surrounding and enclosing the rubber sleeve. The bolt is longer than the sleeve and sheath, its threaded ends projecting outwardly and being available to receive securing nuts, as is usual.

Fig. 7 shows one form of the partially assembled bolt and sleeve member. It includes the bolt 10 and a single sleeve 11 which is larger in diameter and shorter than in the final assembly, of Fig. 9. The rubber is a tight fit on the bolt, because it has either been cast, molded or pressed in situ, or, the original hole in the sleeve was smaller than the bolt. The rubber may be applied to the bolt either in one or in a plurality of separate pieces, Fig. 2 showing two pieces, the total volume of which is the same as the single piece of Fig. 9.

We may assume that the machine now to be described is served with, or has fed to it two streams of articles, to wit, empty metal sheaths, and partially assembled bolt and sleeve members, such as shown in Fig. 1.

The machine shown comprises a suitable frame 20 on which is rigidly mounted a strong heavy cross bar 21, to the front face of which is removably attached, as by bolts 21a, a heavy block 21b (Fig. 5) having a semi-cylindrical curved recess or seat 22 to receive the sheath to be assembled, and which cross bar provides a rigid abutment or anvil member to receive the impact and thrust of the assembling operation. In the abutment bar 21 is mounted a tube 23 having an opening 24 into which the far end of the bolt is pushed, and through which an endwise adjustable ejector pin 25 may operate. Upon and above cross bar 21 is a magazine 26 large enough to hold a quantity of the metal sheaths lying horizontally one above another and to the upper end of which sheaths are fed either manually or automatically, in any usual manner. As each unit is assembled and ejected the pile of sheaths moves down one step, thus advancing the next sheath to assembly position.

In front of the cross bar 21 is a crosshead 27 adjustably secured, as by set screws or clamps 28, to two parallel rods 29. These rods slide through guide openings in the stationary frame bar 21 and are connected at their outer ends by a cross bar 30 which supports the ejector pin 25 before referred to. The opposite or near end portions of rods 29 slide in openings 31 in a pusher bar 32 provided with rollers 32a mounted to travel on suitable tracks on the side members 33 of the frame and provided with means for operating it, to be later described. Compression springs 34, mounted upon rods 29 between the pusher and collars 35 adjustable on the rods, permit relative yielding motion longitudinally, as will be readily understood.

Rods 29, cross bar 30 and cross head 27 together form and provide a carriage mounted for reciprocating movement upon the stationary frame. The crosshead 27 of said carriage supports those parts which accomplish the necessary shaping operations, to wit, reduction in diameter and elongation of the rubber sleeve. For that purpose the crosshead 27 is pierced with a large opening to receive the generally cylindrical shank of a removable strong, heavy forming block or member 36 having a semi-cylindrical curved recess or seat 37 to receive the partially assembled bolt and sleeve member to be operated upon, a seat much resembling and located coaxially with that for the sheaths. Set screws or bolts 36a hold the block in place. Above seat 37 is a magazine 38 for the bolt and sleeve members, corresponding to magazine 26. Opposite said seat 37 the shank of the block is provided with a through channel or opening 39, tapering toward the cross bar 21 and emerging through a tapered nose 40 at the other end of the shank. This nose is reduced at its outer end, and is provided with a small annularly extending recess or groove 40a to receive the plain free end of the sheath, and prevent its escape laterally while under endwise pressure during the assembling operation.

Removability of the blocks 21b and 36 enables them to be readily and quickly interchanged with others having seats and openings of other sizes for larger or smaller shackle bolts. But in each case the seats and openings are so formed on the blocks as to be in proper axial alinement with each other and with other working parts when in operating position.

Preferably bar 27 carries an inclined deflector 41 (Fig. 1) arranged, when the nose is advanced, to engage the next sheath above the one being operated upon and to slightly elevate it to a position clearly out of the way of the advancing nose, so that it does not interfere with and is not injured by said nose, when the latter engages the sheath to be assembled.

The pusher bar 32 supports and forms part of a heavy plunger 42 in coaxial alinement with the seats in the anvil and forming blocks and slidable in a stationary barrel guide 43 mounted on the frame, said plunger having a reduced stem 44 designed to engage the end of the bolt and to advance it, moving through seat 37 as it does so.

Any suitable operating means may be provided for producing longitudinal motion of the working parts, such as cranks and connecting rods or the like. The drawings show, however, a cross shaft 50 provided with pulleys 51 to receive driving belts 52 and with a heavy fly wheel 53 for balancing the parts and supplying steadying inertia and smooth operation. Driving belts 52 run over pulleys 54 on a power driving shaft 55 driven from any suitable power source (not shown) and at any desirable speed. The shaft 50 carries a cam or eccentric 56 engaging a roller 57 carried by the pusher bar 32, for advancing it, while springs 34 and a strong tension spring or springs 58 return it.

It is assumed that magazine 26 is filled with a number of the sheaths 12, the lower one of which lies in the seat 22 ready for introduction of the bolt and rubber sleeve assembly into it, and that magazine 38 is filled with a number of bolt and sleeve assemblies, the lower one of which rests in the seat 37. Prior to their introduction into the magazine, these bolt and sleeve members may be dipped in or coated with oil or grease to enable the rubber to slide more easily through the forming channel 39, although this is not necessary.

It is further assumed that all operating parts are retracted and that the machine is in operation at the beginning of assembling movement.

Cam 56 engages, or is about to engage roller 57. Its high lobe or operating portion advances the pusher bar 32 and plunger 42 and the reduced stem 44 thereof carried by the pusher bar, the plunger 42 sliding through its barrel guide 43. At the same time, the forward movement of the pusher bar is transmitted through compression springs 34 to the parallel rods 29, which also advance, carrying with them the entire carriage, including crosshead 27. This crosshead moves forward until the advance end or nose of the forming block engages the end of the sheath 12. The engagement is effected accurately and without any possibility of the nose engaging or injuring the next following sheath, which has been engaged by the deflector 41 and lifted out of the way just before the nose reaches the sheath to be operated upon.

As soon as the nose engages the end of the sheath, further advance motion of the carriage and its crosshead 27 stops, but the pusher bar 32 and plunger 42 continue to advance. The reduced stem 44 of plunger 42 has engaged the end of the bolt 10 and its continued advance causes the bolt and the rubber sleeve or sleeves mounted upon it to move forward through the tapered channel 39. The effect of the restriction afforded by this channel is to diametrically reduce the size of the rubber ring to a diameter equal to or slightly less than that of the sheath 12, with consequent elongation of the rubber sleeve, as shown in Fig. 8. In this manner and form the reduced sleeve, and the bolt upon which it is mounted, are driven or pushed into the sheath. The motion continues to the end of the stroke of plunger 42, or until the advance end of the rubber sleeve engages the bar 21 or the far end of the sheath, which serves as a stop to limit further advance of the rubber sleeve. But the bolt continues to move up to the end of the stroke of the plunger.

A descending portion of the cam 56 permits both the plunger 42 and rods 29 to retire, under the influence of the retracting tension springs 58 and 34, thus returning all parts to original position.

During such retiring motion of rods 29, the ejector pin 25 engages the outer end of the bolt and ejects the completed article from its seat in the cross bar 21, the finished article dropping through an opening in the frame into a suitable container 59 for the finished articles.

Since the operation described has assembled the lowermost bolt and rubber sleeve in magazine 38 with the lowermost sheath in magazine 26, and the finished article has been ejected, the piles of bolts and sheaths in the magazines descend one step, feeding new articles into appropriate position for assembly and the machine proceeds as before with another assembling cycle.

The machine described is of relatively simple form, is adjustable to take care of different lengths of the articles upon which it works and may be made in various sizes, as will be readily understood. It is highly efficient and rapid in operation and performs its required duty at low cost and without constant attention.

Other advantages of the invention will be apparent to those skilled in the art.

What I claim is:

1. A machine for introducing endwise into its enclosing tubular sheath the precoupled rod and rubber sleeve member of a resilient bushing, comprising a frame, a stationary support mounted thereon and provided with a holding seat for supporting a sheath with its central axis horizontally disposed, a carriage movably mounted upon the frame for reciprocation along lines parallel to said axis, a forming block mounted upon the carriage and having a forming channel tapering toward the sheath seat and at the large end of said channel having a carrying seat for supporting a rod and a sleeve member in axial alinement with the channel and sheath, a plunger slidably mounted upon the frame with its operating end portion presented toward the carrying seat for movement along said axis to and through said forming channel, yielding means connecting the plunger and carriage and normally biasing the forming block toward and the plunger away from the stationary support, and means for advancing the plunger, whereby the plunger and block and a rod and sleeve member carried by the block all advance together until the block engages the near end of the sheath, whereupon block advance ceases and the plunger alone advances and pushes the rod and sleeve member through the tapered forming channel, to thereby reduce and elongate the sleeve, and at the same time telescopically insert the rod and sleeve member into the sheath.

2. A machine for introducing endwise into its enclosing tubular sheath the precoupled rod and rubber sleeve member of a resilient bushing, comprising a frame, a stationary support mounted thereon and provided with a holding seat for supporting a sheath with its central axis horizontally disposed, a carriage movably mounted upon the frame for reciprocation along lines parallel to said axis and provided with rearwardly extending rod members, a forming block mounted upon the carriage and having a forming channel tapering toward the sheath seat and at the large end of said channel having a carrying seat for supporting a rod and sleeve member in axial alinement with the channel and sheath, a plunger slidably mounted upon the frame with its operating end portion presented toward the carrying seat for movement along said axis to and through said forming channel, said plunger being provided with a cross head having openings through which the carriage rods slide, compression springs sleeved upon said rods and providing a yielding connection between the plunger and carriage and normally biasing the forming block toward and the plunger away from the stationary support, and means for advancing said cross head and the plunger connected thereto, whereby the plunger and block and a rod and sleeve member carried by the block all advance together until the block engages the near end of the sheath, whereupon block advance ceases, said springs yield, and the plunger and its cross head advance and push the rod and sleeve member through the tapered forming channel, to thereby reduce and elongate the sleeve, and at the same time telescopically insert the rod and sleeve member into the sheath.

3. In a machine of the character described, the combination of a frame provided with a sheath support, a carriage movably mounted upon the frame and provided with a forming block having a forming channel terminating at one end in a nose arranged to engage a sheath on its support and at the other end with a seat for a rod and sleeve member, means for advancing the carriage, a movable plunger for advancing the rod and sleeve member from its seat through said channel into the sheath, a magazine mounted upon said sheath support and adapted to support a series of tubular sheaths piled in serial order one above another with the lowermost sheath in position on its support, and means arranged upon each advance movement of the forming block to engage and temporarily lift the next sheath in the series out of the way of the advancing block, to thereby prevent undesirable impingement of the block upon the sheath so lifted.

4. In a machine of the character described, the combination of a frame provided with a sheath support, a carriage movably mounted upon the frame and provided with a forming block having a forming channel terminating at one end in a nose arranged to engage a sheath on its support and at the other end with a seat for a rod and sleeve member, means for advancing the carriage, a movable plunger for advancing the rod and sleeve member from its seat through said channel into the sheath, a magazine mounted upon said sheath support and adapted to support a series of tubular sheaths piled in serial order one above another with the lowermost sheath in position on its support, and a finger mounted upon and extending forwardly from the forming block and movable therewith and arranged upon each advance movement thereof to enter the end opening of the next sheath in the series and temporarily lift said sheath out of the way of the advancing block.

EDWARD J. KORECKY.

REFERENCES CITED

The following references are of record in the file of this patent:

UNITED STATES PATENTS

| Number | Name | Date |
|---|---|---|
| 1,152,513 | Jeavons et al. | Sept. 7, 1915 |
| 1,552,645 | Powell | Sept. 8, 1925 |
| 1,729,843 | Reich | Oct. 1, 1929 |
| 1,829,651 | Henderson | Oct. 27, 1931 |
| 2,008,772 | Robertson | July 23, 1935 |
| 2,208,584 | Jeffords et al. | July 23, 1940 |
| 2,270,300 | Hothersaall | Jan. 20, 1942 |
| 2,310,638 | Hubbard | Feb. 9, 1943 |